Dec. 26, 1961  J. A. STALLARD ET AL  3,014,830
METHODS OF BONDING FIBROUS STRUCTURES
Filed March 24, 1959
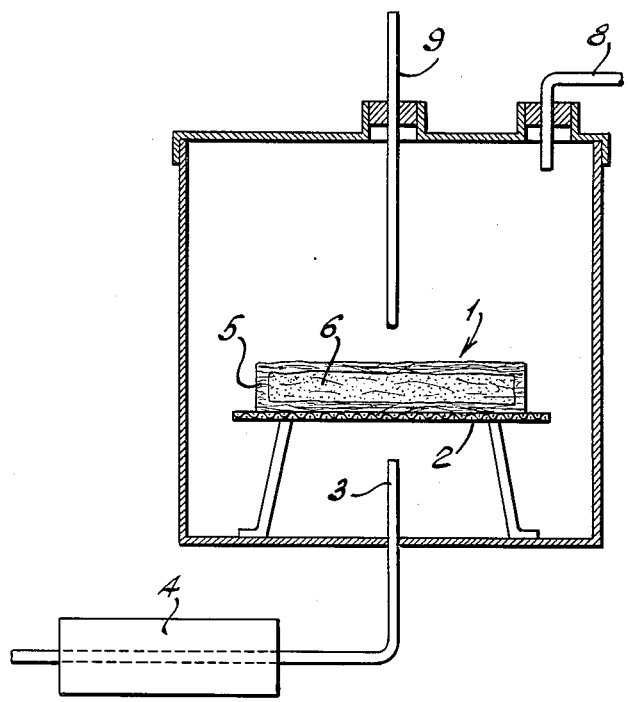
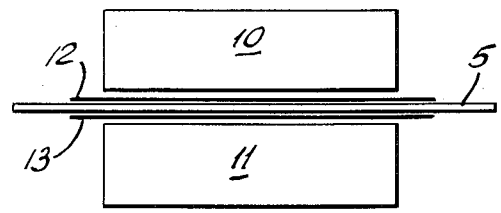
INVENTORS:
JOHN ARTHUR STALLARD
THOMAS PARRY DAVIES
BY
Alexander T. Kardos
ATTORNEY

3,014,830
METHODS OF BONDING FIBROUS STRUCTURES
John Arthur Stallard and Thomas Parry Davies, Skipton, England, assignors to Chicopee Manufacturing Corporation, New Brunswick, N.J., a corporation of Massachusetts
Filed Mar. 24, 1959, Ser. No. 801,612
Claims priority, application Great Britain Apr. 9, 1958
4 Claims. (Cl. 156—36)

This invention relates to improved bonded synthetic fibrous and filamentous structures and in particular to bonded synthetic fibrous and filamentous structures consisting entirely or almost entirely of the material forming the synthetic fibres or filaments. Hereinafter, the term "fibres" shall be taken to include filaments.

In the manufacture of woven or knitted textile goods, fibres are first secured to one another by spinning them to form yarns which are then woven or knitted. There are, however, a great number of uses to which fibres can be put where they are not necessarily converted first into spun yarns but are present in fibrous form in an article in a more individual form. In such cases where mechanical strength is important, it is often necessary to bond the fibres together in such an article. One particularly important application for fibres of staple length, i.e. having a length of from about ¼ inch to about 8 inches, is in the formation of a so-called non-woven fabric comprising a web of fibers which have been secured together by a bonding agent.

Various substances have been employed to bond the fibers together and earlier proposals for the manufacture of non-woven fabrics have resulted in the bonded structures consisting of at least two different substances, namely the material forming the fibres and the material forming the bonding agent. In certain cases, this is not a particular disadvantage because both the bonding agent and the fibres can withstand the conditions to which the bonded structure is to be subjected. However, if it is required to make a structure formed from fibres which are to stand up against the action of certain extraneous agencies, it is difficult to find a suitable bonding agent which has both the properties of bonding the fibres together securely and also resisting such extraneous agencies. For example, although fibres of polyethylene terephthalate have great mechanical strength and resistance to acids, it would not be possible to use an article made from these fibers and bonded together with a viscose glue if highly acidic conditions are to be encountered.

It will be apparent, therefore, that it is desirable to have a bonded structure in which the bonding material has the same chemical composition as that from which the fibers are formed. Some effort has been made to obtain such structures by using a polymer of lower molecular weight to bond fibres of the same chemical composition but having a higher molecular weight. This method has not, however, provided a complete solution to the problem because the bonding agent not only has a lower softening point and also has a greater degree of solubility in organic solvents than the fibres. It may be said that, when using such a low molecular weight polymer as a bonding agent for fibres of high molecular weight, the bonding agent is actually a different material from that of the fibres and it suffers the same defects as bonding agents of totally different chemical composition.

In order to obtain the bonded structures consisting entirely of the material forming the synthetic fibres when the latter are thermoplastic in nature, it has been proposed to omit the addition of an extraneous bonding material and to autogenically bond the fibrous structure by using heat sealing techniques. In theory, the web is heated just sufficiently to cause softening of the synthetic fibres which then fuse together at their points of intersection. We have found, in practice however, that in most cases it is very difficult, if not impossible, to cause effective bonding without a substantial proportion of the fibres melting in the area to which heat has been applied and losing their fibrous character.

It has now been discovered that a bonded structure consisting entirely or almost entirely of the material forming the fibers can be obtained by treating a web of fibers with a solvent or a swelling agent for the material of the fibres to cause tacking or uniting at the points of intersection of the fibres without causing any substantial loss of the fibrous character of the structure as a whole, and then removing all or most of the swelling agent. Hereinafter, the term "swelling agent" shall include a solvent for the fibres.

A variety of structures can be obtained having a wide variation in density depending upon the particular method of bonding selected. Thus, if a mass of loose fibres previously treated with the requisite amount of swelling agent is heated without application of any external pressure, a light bonded structure can be obtained. Alternatively, if a treated web of fibres is heated under pressure, a sheet of a much more dense material will be obtained. If in this case heating is carried out between smooth flat metal platens, the bonded structure will also be smooth and bonding will take place throughout the web wherever there is swelling agent.

The bonding, however, need not be even or continuous throughout the fibrous mass and it is possible to obtain bonded structures displaying different physical properties by applying heat and pressure locally. For example, if an impregnated web is heated under pressure between grids of expanded metal, bonding can be made to occur only where the individual grids make contact with the web and the web will take on a quilt-like structure with the bonding lines arranged in the form of a lattice. Other forms of bonded webs can be obtained by passing an impregnated web between heated rollers one of which is provided with heated protuberances.

The swelling agent can be applied in a number of different ways, for instance, it can be sprayed onto a mass of fibres or alternatively it can be poured in streams or sprinkled in drops onto it. The treated fibres can then be kneaded or passed through a scutcher or other opening or picking machines to ensure that the swelling agent is evenly distributed throughout the fibres while maintaining them in a loose open form. After kneading or passage through the scutcher, it is usual to card the fibres and to form a web from a number of carded plies before heating. When the swelling agent is applied by spraying or dropping, the fibres are seldom actually saturated and, therefore, although perhaps slightly damp or greasy to touch, they never lose their loose flocculent nature.

Although carding is the preferred form of the starting fibrous web, it is to be appreciated that the fibrous web may also be formed by garnetting processes, air deposition, fluid papermaking techniques, or the like. Carding is preferred inasmuch as it yields the most highly oriented and aligned fibrous structure.

For some purposes, it is unnecessary to bond all the fibres in a thick web so long as the eventual structure has good mechanical strength. Thus, a satisfactory filter material can be obtained by spraying the outer layers of the fibres in the web with the swelling agent and then heating the web without any preliminary kneading or passage through the scutcher. The resulting structure consists of a core of relatively un-bonded fibres totally enclosed by a shell of bonded fibres. The swelling agent can also be applied as an aerosol of dispersed solid or liquid particles.

Another form of structure which can be obtained has a density which is intermediate between the dense and flocculent structures just described. This intermediate structure can be obtained by saturating a web with the swelling agent, squeezing out the excess of the swelling agent in a mangle, or other form of press, and then heating the compressed web without the simultaneous application of any pressure. During the heating process the compressed web tends to expand to a certain extent and bonding occurs while it is in that expanded condition. When a web is saturated, it is possible to control the amount of residual swelling agent by adjusting the pressure of the machine used to express the excess swelling agent.

The swelling agent need not necessarily be a liquid and in such cases where a solid is employed, it is necessary to apply it in a suitably fluidised form, for example, as a solution or dispersion in a liquid vehicle. In some cases the swelling agent may have such great powers of dissolution on the fibres that it is necessary to apply it as a dilute solution in order to avoid the fibrous structure of the article being destroyed.

Although many types of synthetic fibres can be used, in general they are derived from high molecular weight, long chain, synthetic, polymeric substances and should have a low moisture regain i.e. the regain should not exceed about 5% at 25° C. in an atmosphere of 65% relative humidity. Very suitable fibres are made from polyethylene terephthalate and sold under the registered trademarks "Terylene" and "Dacron"; polyamides such as, for example, nylon, which term shall hereinafter be considered as generic to the various forms of polyamides including hexamethylenediamine-adipic acid (nylon 6/6), hexamethylenediamine-sebacic acid (nylon 6/10), polycaprolactam (nylon 6), 11-amino undecanoic acid (nylon 11), sold under the registered trademarks "Perlon," "Nylenka," "Caprolan," "Igamid," "Rilsan" and "Amilan"; acrylic fibres sold under the registered trademarks "Courtelle," "Verel," "Creslan," "Orlon," "Acrylast," and "Acrilan"; vinyl chloride/vinyl acetate copolymers, one of which is sold under the registered trademark "Vinyon," vinyl chloride/acrylonitrile copolymers such as for example that which is sold under the registered trademark "Dynel," polyvinylidene chlorides such as for example that which is sold under the registered trademarks "Saran" and "Velon"; cellulose triacetates such as for example that which is sold under the registered trademarks "Tricel" and "Arnel"; polyalkylenes such as low and high density polyethylene and polypropylene; and polytetrafluoroethylene ("Teflon").

It is possible to bond mixtures of the above fibres and also mixtures of fibres which need not all comprise materials capable of being affected by a swelling agent. Thus it is possible to obtain a suitable bonded structure by treatment of a mixture of fibres with a swelling agent which is effective as a bonding agent with only one of the types of fibres present. In such instances, however, it is necessary to ensure that sufficient of the bondable fibres are present to ensure that the resulting structure has the desired physical characteristics. For most applications, at least about 5% by weight of bondable fibres should be present.

A wide variety of swelling agents for the above-mentioned synthetic fibres have been investigated in the textile industry. Unfortunately, some of these swelling agents have not been sufficiently soluble in water or organic solvents and difficulties have been encountered thereby. Other swelling agents have had low vapor pressures and have persistently remained in the bonded non-woven fabric whereby extensive washings and other after-treatments have been required for their removal. Others have remained in the bonded non-woven fabric despite extensive washings and have caused discoloration thereof subsequently. Still others of the swelling agents have been toxic and/or corrosive, thereby creating hazards and impairment to man and to machine. And, finally, others have had undesirable effects on natural or cellulosic fibres which were incorporated in fibre blends, when desired or required.

It has now been determined that chloral or chloral hydrate is capable of fulfilling all the necessary bonding requirements but at the same time, it is capable of avoiding the disadvantages noted hereinabove, particularly those of low solubility in water and organic solvents as well as low vapor pressure and volatility.

Chloral ($CCl_3CHO$) is available as a colorless liquid having a boiling point of 98° C. It is very soluble in water and chloroform and is soluble in all proportions in alcohol and ether. Chloral hydrate ($CCl_3CH(OH)_2$) is available as colorless, transparent or white crystals which slowly volatilize, when exposed to air at room temperature. It is also soluble in chloroform, alcohol and ether and is very soluble in water, 470 grams of chloral hydrate dissolving in 100 ml. of water at 17° C.

As a consequence, such a swelling agent may be easily removed promptly by a water wash after the bonding process is completed without necessarily requiring the application of heat and/or pressure. And, in the event that some residue of chloral remains after the water wash, it naturally and automatically vanishes through volatilization in time. Chloral, which term shall be used to describe both chloral and chloral hydrate henceforth, is relatively inert to natural and synthetic cellulosic fibers such as cotton and rayon and therefore their inclusion in a blend of fibres to be bonded introduces no difficulties on that score.

The proportion of swelling agent to be used can vary to a wide extent, for example, from about ¼% to about 20% by weight of the starting web, either dry or containing normal regain moisture. In general, it is preferred, however, to use from about 10% to about 15% by weight of the swelling agent. It should be noted, however, that it is important to avoid using such a high proportion of the swelling agent which might result in the fibrous nature of the structure being impaired. For certain fibres, such as "Dacron" and "Dynel," for example, which have more resistance to the impairing effect of chloral, increased concentrations of up to about 50% and even to 88% chloral may be used, depending on circumstances.

Bonding of the treated fabrics can occur over a wide range of temperatures. In general, however, it is desirable to use heat in order to accelerate the process. Almost any temperature can be employed so long as it results in bonding without detriment to the fibrous character of the web. In bonding nylon and "Terylene," 150° C. has been found to be very convenient.

The time taken to effect bonding is usually quite short and depends upon the nature of the bonding agent and the composition and weight of the fibres. In general, when making a compact product of high density by heating an impregnated web under pressure in a press, a convenient heating time usually lies in the region of from about 10 to about 16 seconds. However, when bonding a partially or completely uncompressed web, longer times are required e.g. from about 30 seconds to about 15 minutes, because it takes a greater length of time for heat to penetrate to the centre of the web. When heating thick webs, it is convenient to subject the treated web to a stream of heated air since by this method it is possible not only to heat the centre of the web more readily but also to eliminate excess of the swelling agent more efficiently.

In the following specification and accompanying drawing, there is described and illustrated a preferred embodiment of the present invention. Such disclosure is primarily illustrative and the broader aspects of the inventive concept are not to be considered limited thereto except as determined by the scope of the appended claims.

In the drawings,

FIGURE 1 is a schematic drawing showing a preferred embodiment of apparatus suitable for carrying out the preferred processes of the present invention, when heating is desired; and FIGURE 2 is a schematic drawing showing another preferred embodiment of apparatus suitable for carrying out the preferred processes of the present invention, when heating and the application of pressure are desired.

In FIGURE 1 there is illustrated a treated fibrous web 1 resting on a wire mesh 2. A conduit or pipe 3 is provided to supply a stream of air which has been heated to a desired temperature, such as by an electrical coil 4. The stream of air passes through the electrical coil 4 and enters the interior of a chamber 7 which encloses the fibrous web 1 being treated on the wire mesh support 2. The chamber 7 is provided with an exhaust duct 8 whereby the stream of air may escape after having passed through and heated the fibrous web 1. A thermometer 9 is provided whereby the temperature of the interior of the chamber can be determined.

After the fibrous web 1 has been heated for a sufficient period of time, a completed product is obtained comprising an outer layer 5 of bonded fibres, substantially totally enclosing an inner core 6 of relatively unbonded fibres. Evidence that bonding has occurred among the surface layers of fibres is obtained by attempting to pull them away from one another. It is found that considerably greater effort is necessary than is required to separate the fibres of the inner layers from one another.

In FIGURE 2, there is illustrated another embodiment of apparatus suitable for carrying out the processes of the present invention. In this figure, electrically heated jaws 10 and 11 of a press are provided and possess smooth, removable metal plates 12 and 13. A fibrous web 5 is adapted to be positioned between the metal plates 12 and 13 and to be heated under pressure. The final bonded product, in contrast to those resulting from the use of the apparatus of FIGURE 1, is considerably thinner, denser and more compact.

The invention will be further illustrated in greater detail by the following specific examples. It should be understood, however, that although these examples may describe in particular detail some of the more specific features of the invention, they are given primarily for purposes of illustration and the invention in its broader aspects is not to be constructed as limited thereto.

*Example I*

A mass of nylon 6/6 fibres (hexamethylenediamine-adipic acid) in the form of a web 1 inch in thickness is sprayed with a solution consisting of 10% chloral hydrate and 90% by weight of water. Sufficient of the solution is applied to the outer layers of the web so that they receive 10% by weight of chloral hydrate. The web is then supported on a wire mesh and is subjected to a stream of air heated to 120° C. for 2 minutes on the apparatus illustrated in FIGURE 1 of the accompanying drawings.

The resulting bonded material is suitable for the filtration of alkaline solutions such as those encountered in bottle washing plants.

*Example II*

A card web of 6 denier, 2½ inch staple nylon 6/6 fibres is immersed in a 20% aqueous solution of chloral hydrate and is passed through squeeze rollers so as to leave 100% by weight of the solution, based on the weight of the fibres. The impregnated web is pressed between heated platens at a temperature of 120° C. for 10 seconds under an applied load of 3000 pounds per square inch. A bonded fabric is produced which possesses excellent wet strength and consists of approximately 100% nylon. The fabric weight is 3500 grains per square yard. The bonded fabric has a relatively high density and is suitable as a filter.

*Example III*

A card web of "Terylene" fibres (polyethylene terephthalate polyester) of 3 denier and 2½ inch staple length is sprayed with an 80% aqueous solution of chloral hydrate so that the polyester web holds 10% of its weight of solution. The sprayed web is passed through a 2 steel bowl calender in which both bowls are heated to 120° C. The web is passed through the calender at a rate of about 10 feet per minute. A bonded fabric is produced which weighs 1750 grains per square yard and consists of essentially 100% polyester fibres. The bonded fabric has a relatively high density and is useful as a stiffening fabric.

*Example IV*

A card web of nylon 6/6 fibres is sprayed with an 80% aqueous chloral hydrate solution so that the web holds 20% of its own weight of solution. The sprayed web is passed at a speed of 8 feet per minute through a 2 steel bowl calender in which the bowls are maintained at a temperature of 120° C. A bonded fabric is produced of approximately 1000 grains per square yard. It consists essentially of 100% nylon, has a relatively high density and is useful as a filter.

*Example V*

A web containing 6 denier, 2 inch staple "Terylene" fibres is sprayed with 20% of its own weight of an aqueous solution containing 80% chloral hydrate by weight. After mixing thoroughly, the fibres are carded and the resulting carded web is pressed between heated platens of a press at a temperature of 140° C. and pressure of 1000 pounds per square inch for 5 seconds. A bonded fabric of about 300 grains per square yard is produced and consists essentially of 100% polyester fibres. The resulting product has a relatively high density and is useful as a base for electrical tapes.

*Example VI*

A card web of "Tricel" fibres (cellulose triacetate) is sprayed with an aqueous 80% chloral hydrate solution until the web contains 8% of its weight of the solution. The sprayed web is compressed between heated platens at a temperature of 200° C. and pressure of 3000 pounds per square inch for a period of 5 seconds. The resulting fabric is a somewhat stiff, porous sheet consisting essentially of 100% cellulose triacetate. The resulting product has a relatively high density and is useful as a base for electrical tapes.

*Example VII*

A card web of 6 denier, 2 inch staple "Terylene" fibres is impregnated by immersion in a 20% aqueous chloral solution. The impregnated web is passed through compression rollers so that it contains 100% of its own weight of solution. The impregnated fibres are then dried at a temperature of 130° C. for about 1 minute under a pressure of 1 ounce per square yard. A soft, flexible, bonded fabric is produced having a medium density, with excellent wet strength and a weight of 800 grains per square yard. It is useful in air purification.

*Example VIII*

A card web of 3 denier, 1½ inch staple nylon 6/6 fibres is immersed in an aqueous 10% chloral hydrate solution and passed through compression rollers so that the web contains 100% of its own weight of solution. The impregnated web is then dried at a temperature of 130° C. for 1 minute under a pressure of 1 ounce per square inch. A soft, flexible fabric having a medium density is produced with excellent wet strength and a weight of 400 grains per square yard. It is useful in chemical filtration.

Example IX

A web of 6 denier, 2 inch staple "Terylene" fibres is sprayed with an aqueous 80% chloral hydrate solution until the fibres hold 20% of their own weight of solution. The treated fibres are mixed and carded to give a carded web which is collected and plied to give a wadding about 1 inch thick. The wadding is placed in a stream of hot air at 150° C. and left for 2 minutes. The resulting bonded wadding is resistant to water and has an open, lofty structure which is well-bonded throughout. The bonded fabric is a low density fabric or wadding and has a weight of 3500 grains per square yard. It is useful in the filtration of gases and liquids.

Example X

A mass of 6 denier, "Terylene" fibres is carded and the resulting card web is plied to form a wadding. The wadding is exposed to a stream of chloral hydrate mist until the web contains 5% of its own weight of chloral hydrate. The web is transferred to a hot air oven and subjected to a stream of air heated to 150° C. for a period of 2 minutes. The resulting web has a low density, is lightly bonded throughout and weighs 1500 grains per square yard. It is useful as a padding material.

Example XI

A wadding is made from plied card webs of 3 denier, "Terylene" fibre and is impregnated with a 20% aqueous solution of chloral hydrate. It is passed through compression rollers so that the wadding retains 150% of its own weight of the solution. The wadding is placed in a stream of hot air heated to a temperature of about 120° C. for a period of 5 minutes and is well-bonded throughout, has low density, and is lofty. The resulting bonded fabric has good wet strength, weighs 3100 grains per square yard and is useful as a padding material.

Example XII

A card web of cellulose triacetate fibres having a denier of 5 and a staple length of 2 inches is sprayed with an 80% aqueous chloral hydrate solution until the web contains 20% of its own weight of the solution. The sprayed web is then plied to make a wadding which is placed in a stream of hot air at 150° C. for a period of 5 minutes. Bonds appear throughout the example. The resulting bonded fabric has low density, weights 2500 grains per square yard and is useful as padding material.

The bonded products of this invention can be used for a wide variety of purposes according to the density of chemical and physical properties of the materials forming the fibres. Bonded nylon and "Terylene" fibre webs in accordance with the invention can be used in various chemical processing applications, for air or gas filtration where highly acidic conditions are likely to be encountered, and filtration of oily materials and of other substances which can not be filtered by conventional methods due to disruption of the filter by fungal or bacterial action. Other uses include interliners for clothing which are resistant to perspiration, deodorants, and cleaning, and the making of plain or quilted fabrics for decorative purposes.

Although several specific examples of the inventive concept have been described, the same should not be construed as limited thereby nor to the specific features mentioned therein but to include various other equivalent features as set forth in the claims appended hereto. It is understood that any suitable changes, modifications and variations may be made without departing from the spirit and scope of the invention.

What is claimed is:

1. A method of making a bonded fibrous structure which comprises: forming a fibrous structure containing high molecular weight, long-chain, synthetic polymeric fibres capable of being softened by chloral hydrate; and treating said fibrous structure with a fibre-softening agent comprising an aqueous solution of from about 10% to about 88% chloral hydrate, whereby the individual fibres are softened and adhere to adjacent contacting fibres to form a bonded fibrous structure.

2. A method of making a bonded fibrous structure which comprises: forming a fibrous structure containing high molecular weight, long-chain, synthetic polymeric fibres capable of being softened by chloral hydrate; treating sadi fibrous structure with a fibre-softening agent comprising an aqueous solution of from about 10% to about 88% chloral hydrate; and heating said treated fibrous structure, whereby the individual fibres are softened and adhere to adjacent contacting fibres to form a bonded fibrous structure.

3. A method of making a bonded fibrous structure which comprises: forming a fibrous structure containing high molecular weight, long-chain, synthetic polymeric fibres capable of being softened by chloral hydrate; treating said fibrous structure with a fibre-softening agent comprising an aqueous solution of from about 10% to about 88% chloral hydrate; and passing a stream of heated air through said treated fibrous structure, whereby the individual fibres are softened and adhere to adjacent contacting fibres to form a bonded fibrous structure.

4. A method of making a bonded fibrous structure which comprises: forming a fibrous structure containing high molecular weight, long-chain, synthetic polymeric fibres capable of being softened by chloral hydrate; treating said fibrous structure with a fibre-softening agent comprising an aqueous solution of from about 10% to about 88% chloral hydrate; and applying heat and pressure to said treated fibrous structure, whereby the individual fibres are softened and adhere to adjacent contacting fibres to form a bonded fibrous structure.

References Cited in the file of this patent

UNITED STATES PATENTS

| | | |
|---|---|---|
| 2,459,804 | Francis | Jan. 25, 1949 |
| 2,476,282 | Castellan | July 19, 1949 |
| 2,752,320 | De Witt | June 26, 1956 |